(12) United States Patent
Negishi et al.

(10) Patent No.: US 10,142,870 B2
(45) Date of Patent: Nov. 27, 2018

(54) ESTIMATING APPARATUS AND COMPUTER READABLE STORAGE MEDIUM

(71) Applicant: MOTIV Research Co., Ltd., Tokyo (JP)

(72) Inventors: Takahiro Negishi, Kanagawa (JP); Ragil Putro Wicaksono, Kanagawa (JP); Seiji Kunishige, Kanagawa (JP); Kwangrok Chang, Tokyo (JP)

(73) Assignee: MOTIV Research Co., Ltd., Tokyo (JP)

( * ) Notice: Subject to any disclaimer, the term of this patent is extended or adjusted under 35 U.S.C. 154(b) by 197 days.

(21) Appl. No.: 15/293,240

(22) Filed: Oct. 13, 2016

(65) Prior Publication Data

US 2017/0034725 A1 Feb. 2, 2017

Related U.S. Application Data

(63) Continuation of application No. PCT/JP2015/057158, filed on Mar. 11, 2015.

(30) Foreign Application Priority Data

Apr. 14, 2014 (JP) ................. 2014-083028

(51) Int. Cl.
*H04W 24/08* (2009.01)
*H04B 17/318* (2015.01)
*H04W 24/10* (2009.01)

(52) U.S. Cl.
CPC .......... *H04W 24/08* (2013.01); *H04B 17/318* (2015.01); *H04W 24/10* (2013.01)

(58) Field of Classification Search
None
See application file for complete search history.

(56) References Cited

U.S. PATENT DOCUMENTS

| | | | |
|---|---|---|---|
| 9,622,138 B2 * | 4/2017 | Bontu | H04W 36/0094 |
| 2014/0187255 A1 * | 7/2014 | Dimou | H04W 72/082 |
| | | | 455/452.2 |
| 2015/0312796 A1 | 10/2015 | Shikida et al. | |
| 2015/0326366 A1 * | 11/2015 | Li | H04W 24/10 |
| | | | 370/252 |
| 2017/0202006 A1 * | 7/2017 | Rao | H04W 72/1231 |

OTHER PUBLICATIONS

ETSI TS 136 300 V9.10.0 (Feb. 2013).
(Continued)

*Primary Examiner* — Hicham B Foud (57) ABSTRACT

A load on a wireless communication system is measured without monitoring communication in a network by acquiring a serving cell RSRP indicating a reception strength of a reference signal received from one cell of an LTE system, an RSRQ indicating a reception quality of the reference signal, and a non-serving cell RSRP indicating a reception strength of a reference signal received from another cell other than the one cell, that are measured within the one cell, and deriving, based on the serving cell RSRP, the RSRQ and the non-serving cell RSRP, an estimate value of at least any of a PRB utilization ratio in the one cell and a PRB average utilization ratio in the one cell and the other cell.

19 Claims, 8 Drawing Sheets

(56) References Cited

OTHER PUBLICATIONS

International Search Report for International Application No. PCT/JP2015/057158, issued by the Japan Patent Office dated Apr. 7, 2015.
International Preliminary Report on Patentability for International Application No. PCT/JP2015/057158, issued by the International Bureau of WIPO dated Oct. 27, 2016.

* cited by examiner

| | Top1 | Top2 | Top3 | Top4 | Top5 |
|---|---|---|---|---|---|
| RSRP | −78dB | −88dB | −98dB | −108dB | −118dB |
| RSRQ | −10dB | — | — | — | — |

ESTIMATING APPARATUS AND COMPUTER READABLE STORAGE MEDIUM

The contents of the following patent applications are incorporated herein by reference: JP2014-083028 filed on Apr. 14, 2014 and PCT/JP2015/057158 filed on Mar. 11, 2015

BACKGROUND

1. Technical Field

The present invention relates to an estimating apparatus and a computer readable storage medium.

2. Related Art

In conventional techniques, it has been known to perform measurement of a load on a wireless communication system by monitoring communication in a network (please see Non-Patent Document 1).

[Non-Patent Document 1] ETSI TS 136 300 V9.10.0 (2013-02)

It is desirable to measure a load on a wireless communication system without monitoring communication in a network.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
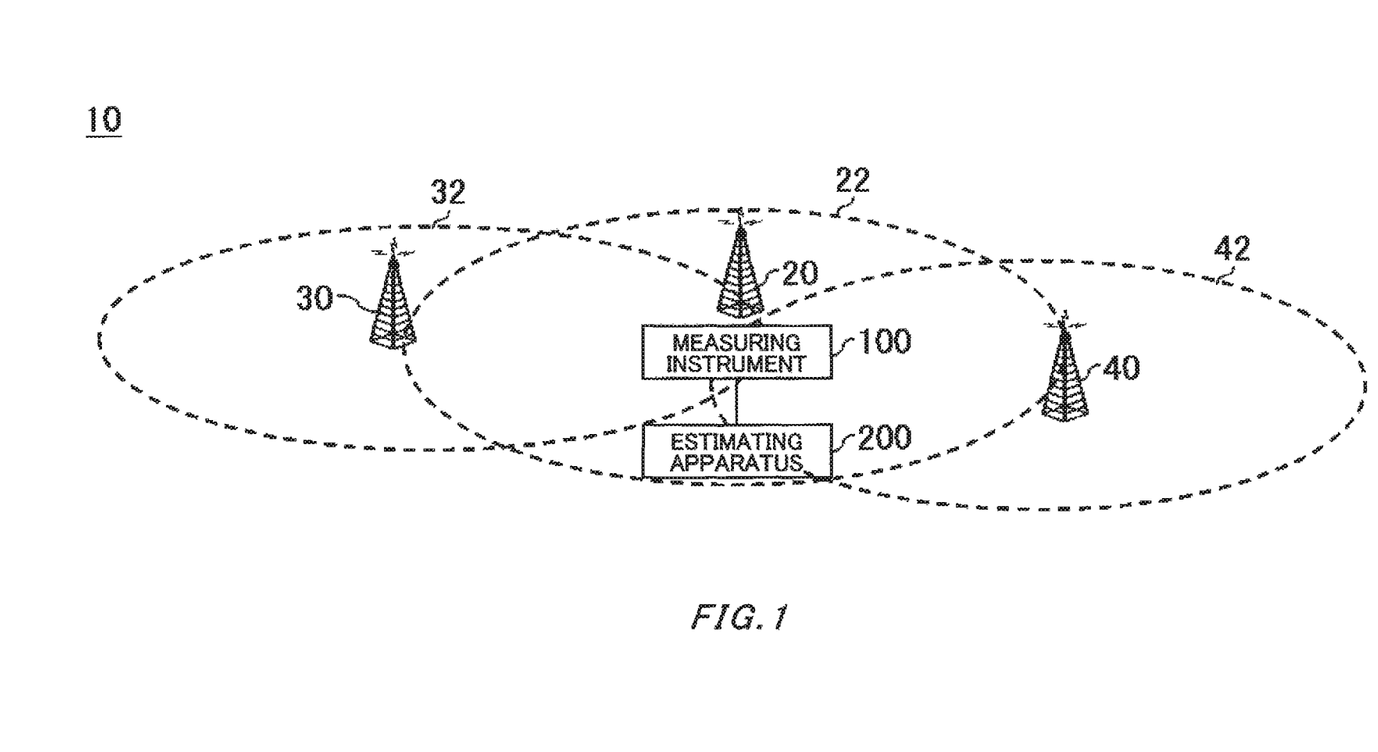
FIG. 1 schematically shows one example of an LTE cell configuration according to an LTE system.

FIG. 1 schematically shows one example of an LTE cell configuration according to an LTE (Long Term Evolution) system 10. The LTE system 10 may be an FDD-LTE (Frequency Division Duplex LTE) system. Also, the LTE system 10 may be a TD-LTE (Time Division LTE) system.

The LTE system 10 has a plurality of eNBs (eNodeBs). In FIG. 1, as examples of a plurality of eNBs that the LTE system 10 has, an eNB 20, an eNB 30 and an eNB 40 are illustrated. The eNB 20 forms a cell 22. The eNB 30 forms a cell 32. The eNB 40 forms a cell 42.

A measuring instrument 100 measures a signal reception strength or the like. The measuring instrument 100 measures, for example, an RSRP (Reference Signal Received Power). The measuring instrument 100 may measure an RSRP of each reference signal among reference signals received from respective ones among the plurality of cells. The reference signals received from the cells may be reference signals received from the eNBs forming the cells.

Among the plurality of cells, a cell that provides a reference signal received by the measuring instrument 100 whose RSRP is the highest is called a serving cell in some cases, and cells other than the serving cell are called nonserving cells in some cases. FIG. 1 illustrates a case where the cell 22 is the serving cell, and the cell 32 and the cell 42 are the nonserving cells. Although in FIG. 1, two nonserving cells are illustrated, the number of nonserving cells is not limited thereto. The cell 22 may be one example of one cell. The RSRP of a reference signal received from the cell 22 may be one example of a serving cell RSRP. The cell 32 and the cell 42 may be examples of other cells. The RSRPs of reference signals received from respective ones among the cell 32 and the cell 42 may be examples of nonserving cell RSRPs.

The measuring instrument 100 may measure an RSRQ (Reference Signal Received Quality) indicating the reception quality of a reference signal received from the cell 22. The RSRQ indicating the reception quality of a reference signal received from the cell 22 which is the serving cell is called a serving cell RSRQ in some cases. Also, the measuring instrument 100 may measure an RSSI (Received Signal Strength Indicator) indicating the total of reception signal strengths. The RSSI indicates a total reception signal strength over the entire band. For example, in an LTE that utilizes the bandwidth of 5 MHz, the RSSI indicates a total reception signal strength corresponding to 25 PRBs (Physical Resource Blocks). Also, in an LTE that utilizes the bandwidth of 10 MHz, the RSSI indicates a transmission/reception signal strength corresponding to 50 PRBs, and in an LTE that utilizes the bandwidth of 20 MHz, the RSSI indicates a transmission/reception signal strength corresponding to 100 PRBs. Also, the measuring instrument 100 may measure an SINR (Signal-to-Interference and Noise power Ratio) indicating a ratio of noise relative to a reference signal received from the cell 22.

The measuring instrument 100 may be a general-purpose measuring instrument that can measure an RSRP, an RSRQ, an RSSI, an SINR or the like in an LTE system. The measuring instrument 100 is, for example, a Scanner. Also, the measuring instrument 100 is, for example, Area Tester (registered trademark).

An estimating apparatus 200 may derive an estimate value of a PRB (Physical Resource Block) utilization ratio in the cell 22 based on data measured by the measuring instrument 100. Also, the estimating apparatus 200 may derive an estimate value of a PRB average utilization ratio in a plurality of cells formed by respective ones among a plurality of eNBs that are transmitters of radio waves received by the measuring instrument 100. The estimating apparatus 200 derives, for example, an estimate value of a PRB average utilization ratio in the cell 22, the cell 32 and the cell 42.

In conventional techniques, the load status of the LTE system 10 is analyzed by monitoring a network, an OSS (Operation Support System) or the like (not illustrated in the figure) that the LTE system 10 has to measure a PRB utilization ratio. For example, in conventional techniques, the load status of the LTE system 10 is analyzed by a monitoring apparatus monitoring an eNB, an MME (Mobility Management Entity), an S-GW or the like included in a network that the LTE system 10 has. However, one that can monitor a network, an OSS or the like is, in some cases, limited to a telecommunications carrier that provides the LTE system 10. Accordingly, in conventional techniques, even if one telecommunications carrier can measure a PRB utilization ratio in an LTE system 10 that it provides, it has been difficult in some cases to measure a PRB utilization ratio in an LTE system 10 that another telecommunications carrier provides. Also, it has been difficult in some cases for one other than a telecommunications carrier to measure a PRB utilization ratio in the LTE system 10. Also, it places a load on a network instrument or takes a human load in some cases to measure a PRB utilization ratio because it is necessary to monitor a network, an OSS or the like.

In contrast, because with the estimating apparatus 200 according to the present embodiment, an estimate value of a PRB utilization ratio in an LTE system 10 can be derived based on data measured by the measuring instrument 100, analysis, by a telecommunications carrier, of a load status of an LTE system 10 provided by another telecommunications carrier and analysis of a load status of an LTE system 10 by one other than a telecommunications carrier can be realized. Also, because with the estimating apparatus 200 according to the present embodiment, it is not necessary to monitor a network, an OSS or the like, a load status of an LTE system 10 can be analyzed promptly without placing a load on a network instrument.

Figure 2:
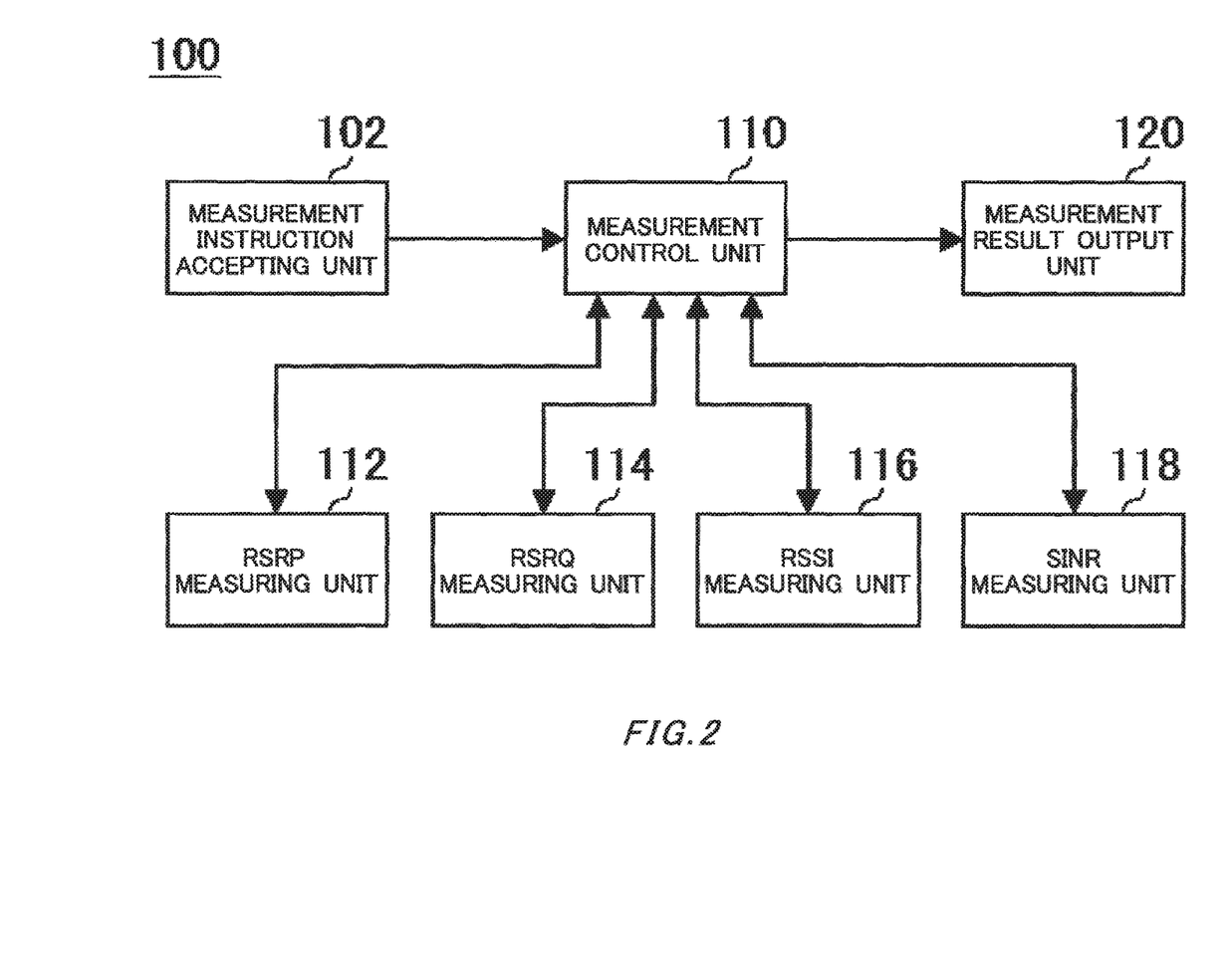
FIG. 2 schematically shows one example of a functional configuration of a measuring instrument.

FIG. 2 schematically shows one example of a functional configuration of the measuring instrument 100. The measuring instrument 100 includes a measurement instruction accepting unit 102, a measurement control unit 110, an RSRP measuring unit 112, an RSRQ measuring unit 114, an RSSI measuring unit 116, an SINR measuring unit 118 and a measurement result output unit 120. It is not essential for the measuring instrument 100 to include all these configurations.

The measurement instruction accepting unit 102 accepts a measurement instruction. The measurement instruction accepting unit 102 may accept a measurement instruction via an interface such as a button or a touch panel. Also, the measurement instruction accepting unit 102 may receive a measurement instruction via a network.

The measurement control unit 110 controls measurement of an RSRP or the like. The measurement control unit 110 may control measurement of an RSRP or the like upon acceptance of a measurement instruction by the measurement instruction accepting unit 102.

The RSRP measuring unit 112 measures an RSRP. The RSRP measuring unit 112 may measure an RSRP of a reference signal received from the cell 22. The RSRP of a reference signal received from the cell 22 may be one example of a serving cell RSRP. The serving cell RSRP may be an average reception signal strength of a plurality of reference signals received from the cell 22. Also, the RSRP measuring unit 112 may measure an RSRP of each reference signal among reference signals received from respective ones among the cell 32 and the cell 42. The RSRPs of each reference signal among reference signals received from respective ones among the cell 32 and the cell 42 may be examples of nonserving cell RSRPs. The nonserving cell RSRP corresponding to the cell 32 may be an average reception signal strength of a plurality of reference signals received from the cell 32. Also, the nonserving cell RSRP corresponding to the cell 42 may be an average reception signal strength of a plurality of reference signals received from the cell 42.

The RSRQ measuring unit 114 measures an RSRQ. The RSRQ measuring unit 114 may measure a serving cell RSRQ indicating a reception quality of a reference signal received from the cell 22.

The RSSI measuring unit 116 measures an RSSI. The RSSI measuring unit 116 measures an RSSI indicating a total of reception signal strengths of signals received by the measuring instrument 100. For example, if the measuring instrument 100 receives signals transmitted by the cell 22, the cell 32 and the cell 42, an RSSI measured by the RSSI measuring unit 116 indicates a total of: strengths of reception signals from the cell 22, the cell 32 and the cell 42; and a reception strength of noise. More specifically, an RSSI measured by the RSSI measuring unit 116 includes RSRPs of reference signals received from respective ones among the cell 22, the cell 32 and the cell 42, reception signal strengths of traffic signals received from the cell 22, the cell 32 and the cell 42, and a reception strength of noise. The traffic signals may be data signals transmitted by the cell 22, the cell 32 and the cell 42.

The SINR measuring unit 118 measures an SINR. The SINR measuring unit 118 may measure an SINR relative to a reference signal received from the cell 22. The SINR relative to a reference signal received from the cell 22 may be a percentage of an RSRP of a reference signal received from the cell 22 and a total of strengths of reception signals from the nonserving cells.

The measurement result output unit 120 outputs a measurement result. The measurement result output unit 120 may display-output the measurement result on a display (not illustrated in the figure) provided to the measuring instrument 100. Also, the measurement result output unit 120 may display-output the measurement result on a display provided to another apparatus. For example, the measurement result output unit 120 display-outputs the measurement result on a display provided to the estimating apparatus 200. Also, the measurement result output unit 120 may transmission-output the measurement result. For example, the measurement result output unit 120 may transmit the measurement result to the estimating apparatus 200.

Figure 3:
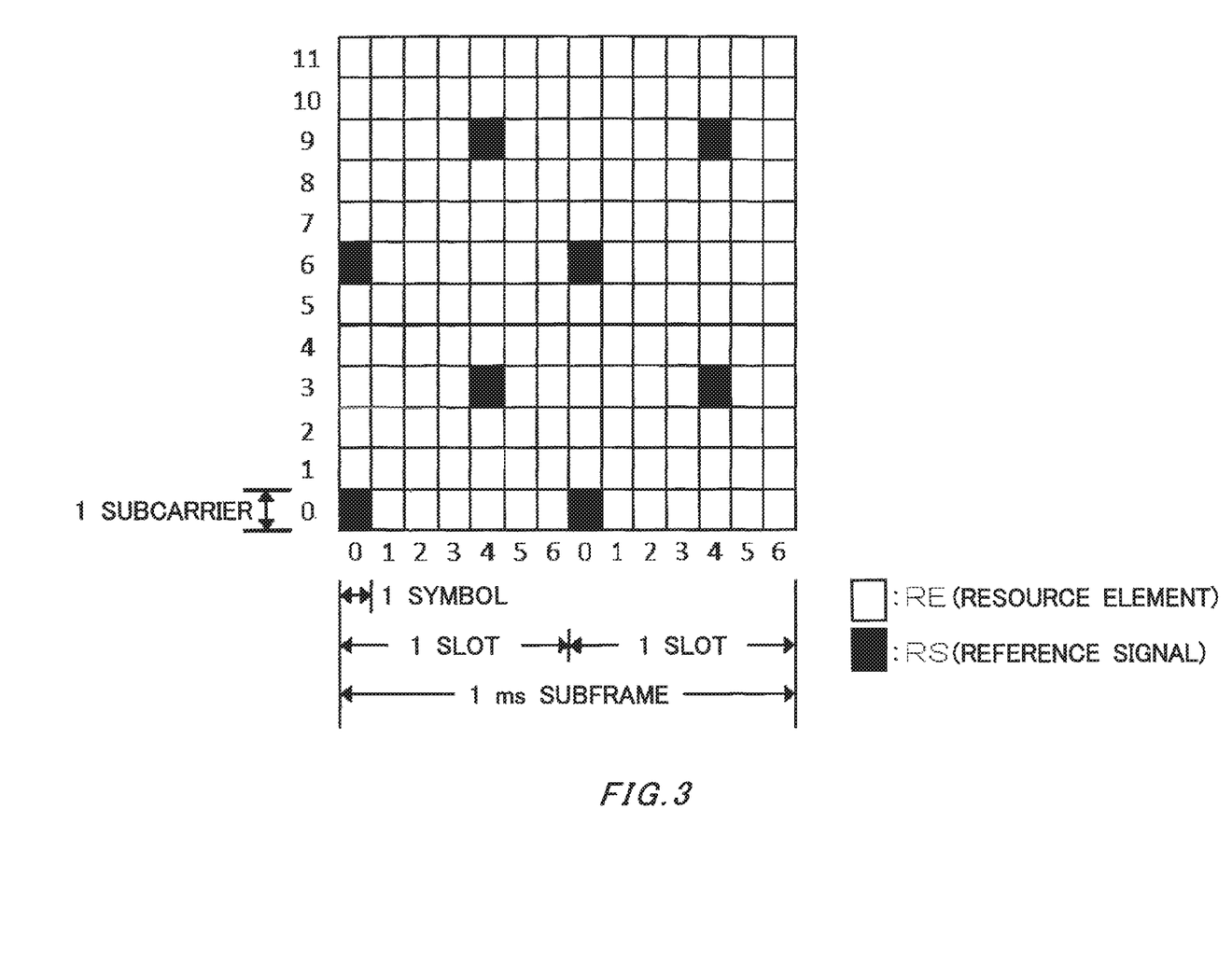
FIG. 3 shows one example of an RS arrangement of reference signals transmitted by a cell.

FIG. 3 schematically shows one example of an RS arrangement of reference signals transmitted by the cell 22. FIG. 3 shows an example of an RS arrangement of one PRB if the antenna port count is one. One PRB includes 12 subcarriers in the frequency direction, and one subframe in the time direction. One subframe includes two slots, and one slot includes six symbols.

An RE (resource element) is defined by one subcarrier and one symbol. REs are used for transmission of traffic signals. RS s (reference signals) are signals utilized for channel estimation or the like, and are arranged at predetermined positions within a PRB. As shown in FIG. 3, if the antenna port count is one, the number of reference signals in one symbol is two, and the number of traffic signals is 0 to 10.

RSs may be arranged according to a predetermined rule. As one example of the rule, two RS s are arranged in one symbol. Also, RSs are arranged every six subcarriers within a single symbol. If the antenna port count is one, RSs are arranged in the symbol 0 and the symbol 4. Between the symbol 0 and the symbol 4, the positions of RSs are shifted by three subcarriers.

Figure 4:
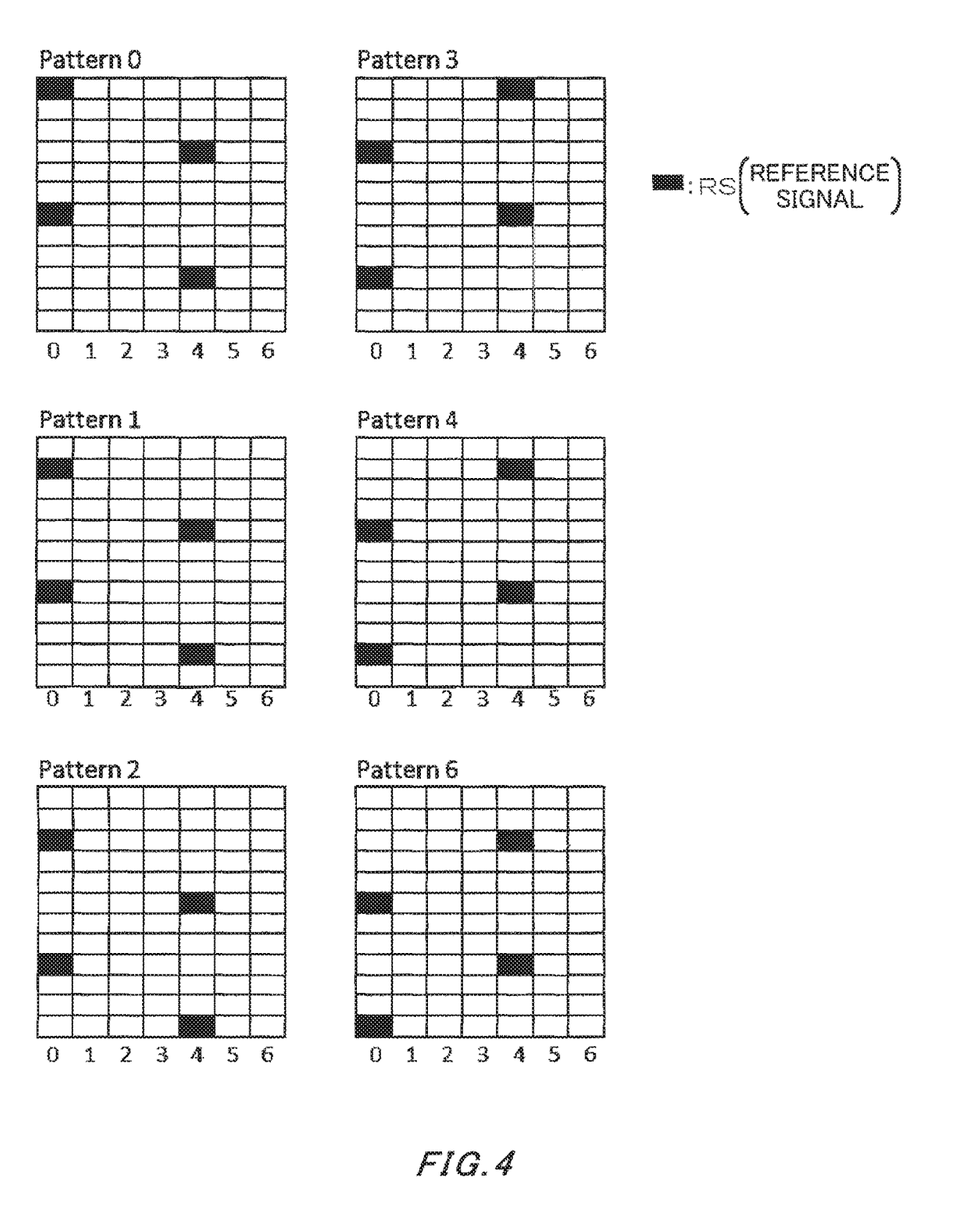
FIG. 4 schematically shows an RS arrangement pattern.

FIG. 4 schematically shows an RS arrangement pattern. As shown in FIG. 4, an RS arrangement may include six types of pattern. The eNB 20, the eNB 30 and the eNB 40 may select RS arrangement patterns to utilize, according to allotted PCIs (Physical Layer Cell Identities). The eNB 20, the eNB 30 and the eNB 40 select one pattern from six types of pattern according to PCI mod 6. If the antenna port count is two, the eNB 20, the eNB 30 and the eNB 40 may select a pattern for a first antenna port according to PCI mod 6, and select a pattern for a second antenna port according to PCI+3 mod 6. By the eNB 20, the eNB 30 and the eNB 40 selecting RS arrangement patterns according to the PCIs, the estimating apparatus 200 can grasp which patterns respective ones among the eNB 20, the eNB 30 and the eNB 40 are utilizing, by acquiring the PCIs of the eNB 20, the eNB 30 and the eNB 40.

Figure 5:
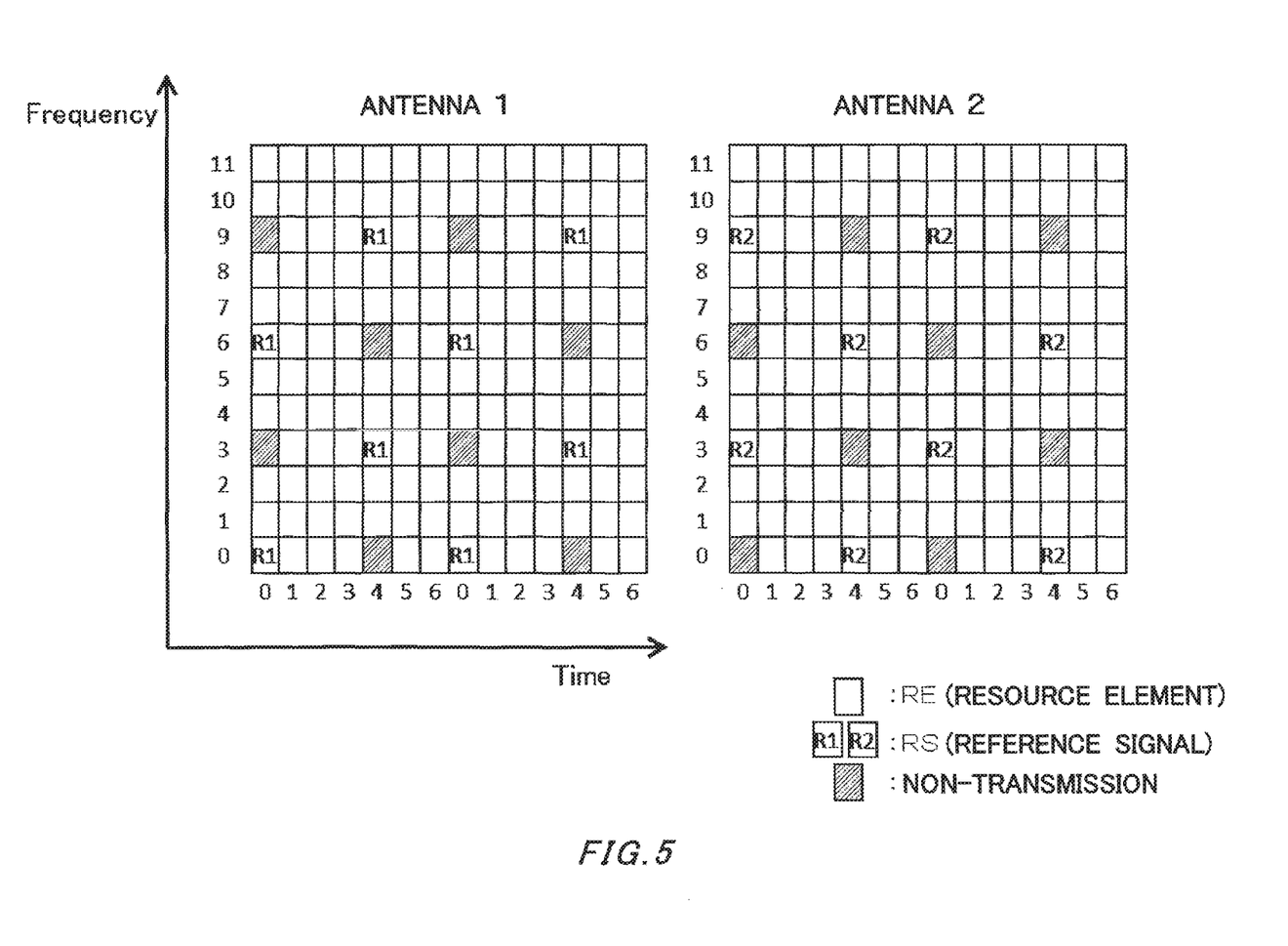
FIG. 5 schematically shows another example of an RS arrangement of reference signals transmitted by a cell.

FIG. 5 shows another example of an RS arrangement of reference signals transmitted by the cell 22. FIG. 5 shows an example of an RS arrangement of one PRB if the antenna port count is two. REs are used for transmission of traffic signals. RS s are signals utilized for channel estimation or the like, and are arranged at predetermined positions within a PRB. Non-transmission is not used for sending a traffic signal. If the antenna port count is more than one, a different RS arrangement is adopted for each antenna.

As shown in FIG. 5, if the antenna port count is two, the number of reference signals in one symbol is four, and the number of traffic signals is 0 to 16. In this manner, depending on the antenna port count, the number of traffic signals in one symbol varies.

For example, if the antenna port count is four, the number of traffic signals in one symbol is 0 to 32. Even if the antenna port count is another number, the number of traffic signals in one symbol can be identified likewise.

If the antenna port count is two, the total power in the entire band at the symbol 0 is expressed by Equation 1.

Total Power=4$N$*RSPower+(0-16$N$)*REPower

RSPower indicates a signal strength of one reference signal. REPower indicates a signal strength of one traffic signal. N indicates the PRB count in the entire band. As indicted by Equation 1, if the antenna port count is two, the minimum value of a total reception signal strength of traffic signals is 0, and its maximum value is 16NREPower. If the antenna port count is one, the minimum value of a total reception signal strength of traffic signals is 0, and its maximum value is 10NREPower. If the antenna port count is four, the minimum value of a total reception signal strength of traffic signals is 0, and its maximum value is 32NREPower. The strength can be calculated likewise even if the antenna port count is another number.

The ratio between RSPower and REPower depends on the antenna port count and on whether or not RS boost has been performed. Also, if RS boost has been performed, it depends on the ratio of RS boost. For example, if the antenna port count is one, and RS boost has not been performed, REPower and RSPower are equal to each other. Also, for example, if the antenna port count is two, and RS boost has not been performed, RSPower is 0.8 times REPower. Also, for example, if the antenna port count is two, and RS boost has been performed at 3 dB, RSPower is twice REPower. Here, if the antenna port count is two and RS boost has been performed at 3 dB, assuming that REPower is x, the ratio between a total reception signal strength of traffic signals and RSPower is 16Nx/2x=8N.

If frames are synchronized between the serving cell and the nonserving cells, the number of reference signals and the number of traffic signals in one symbol in the serving cell are equal to the number of reference signals and the number of traffic signals in one symbol, respectively, in the nonserving cells. Accordingly, if the antenna port count is two, RS boost has been performed at 3 dB, and frames are synchronized between the serving cell and the nonserving cells, the ratio between the maximum value of a total reception signal strength of traffic signals (referred to as a traffic RSSI in some cases) in the entire band, and the sum of the average reception signal strengths of reference signals of the serving cell and the nonserving cells (referred to as a serving/nonserving cell RSRP in some cases) is expressed by Equation 2. The ratio between the minimum value of a traffic RSSI and a serving/nonserving cell RSRP is 0.

Traffic RSSI/Serving/nonserving cell RSRP=8$N$

Likewise, if the antenna port count is one, the ratio between the maximum value of a traffic RSSI and a serving/nonserving cell RSRP is 4N, and if the antenna port count is four, it is 20N. The ratio can be calculated likewise even if the antenna port count is another number.

Also, if RS boost has not been performed, the ratio between the maximum value of a traffic RSSI and a serving/nonserving cell RSRP is 16N.

Also, if the antenna port count is one and RS boost has not been performed, the ratio between the maximum value of a traffic RSSI and a serving/nonserving cell RSRP is 10N. Also, if the antenna port count is four and RS boost has not been performed, the ratio between the maximum value of a traffic RSSI and a serving/nonserving cell RSRP is 44N.

The estimating apparatus 200 according to the present embodiment may calculate an estimate value of a PRB utilization ratio as a percentage of a serving/nonserving cell RSRP relative to a traffic RSSI.

As described above, if the antenna port count is two and RS boost has been performed at 3 dB, the minimum value of a percentage of a serving/nonserving cell RSRP relative to a traffic RSSI is 0 and its maximum value is 8N, and so the estimating apparatus 200 calculates an estimate value of a PRB utilization ratio according to Equation 3.

Estimate value=(Traffic RSSI/Serving/nonserving cell RSRP)/8$N$

If the antenna port count is a number other than two, or if RS boost has been performed not at 3 dB, the estimating apparatus 200 can calculate an estimate value likewise by varying 8N in Equation 3.

Although a case where frames of the serving cell and the nonserving cells are synchronized is mainly explained here, the estimating apparatus 200 can calculate an estimate value by varying some operation contents also if frames of the serving cell and the nonserving cells are not synchronized.

If frames of the serving cell and the nonserving cells are not synchronized, the symbol 0 in the serving cell and the symbol 0 in the nonserving cells are shifted temporally in some cases. In this case, for example, if the antenna port count is two, the maximum value of a traffic RSSI is not 16NREPower. In view of this, if frames of the serving cell and nonserving cells are not synchronized, the estimating apparatus 200 may judge the maximum value of a traffic RSSI according to whether or not reference signals of respective ones among a plurality of PRBs have been received. For example, if the antenna port count is two, the estimating apparatus 200 judges the maximum value of a traffic RSSI as 16$N_1$REPower+24$N_2$REPower, assuming that the number of PRBs reference signals of which have been received is $N_1$, the number of PRBs reference signals of which have not been received is $N_2$. Then, the estimating apparatus 200 may calculate an estimate value by dividing the traffic RSSI by 16$N_1$REPower+24$N_2$REPower.

Figure 6:
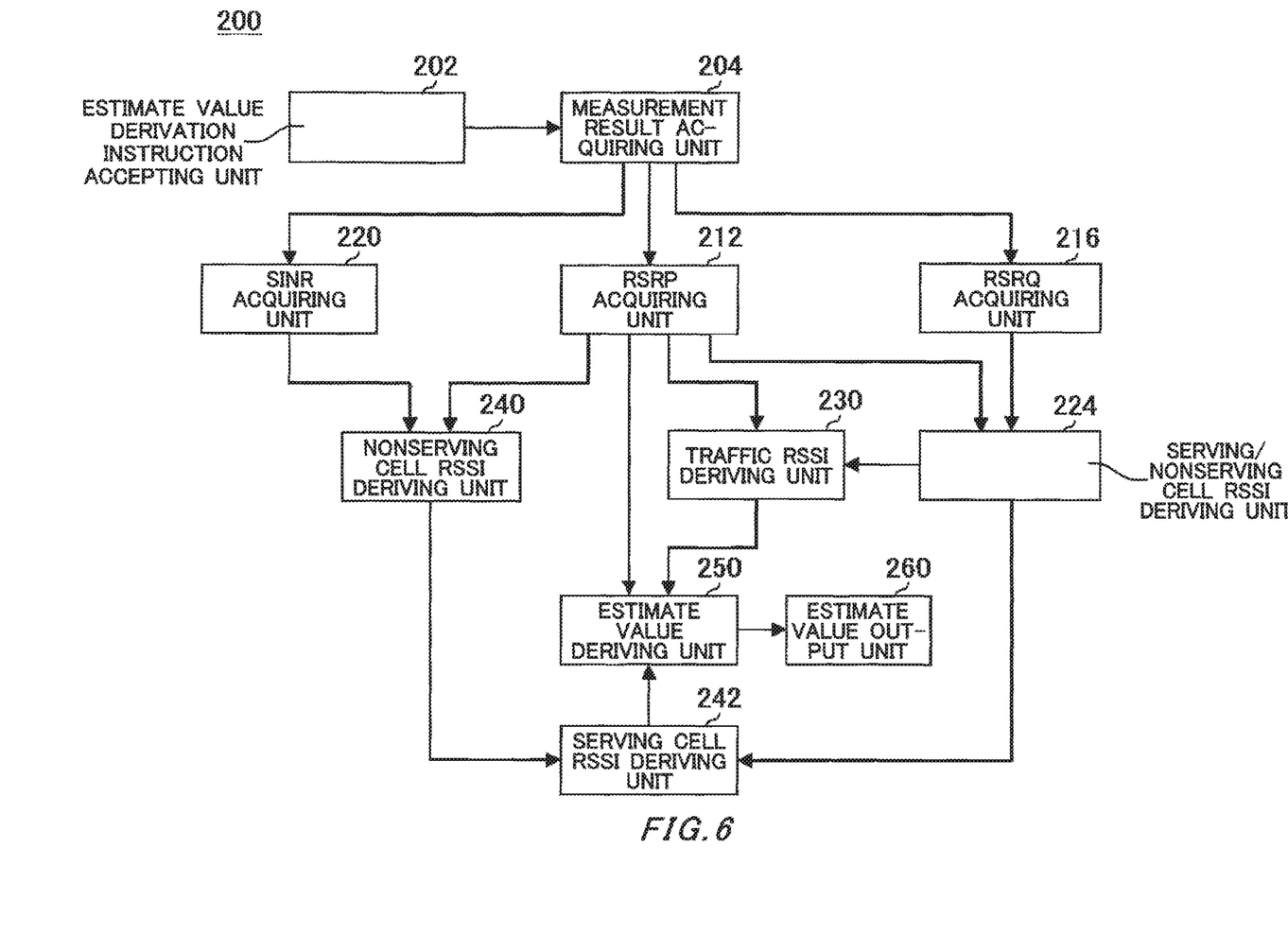
FIG. 6 schematically shows one example of a functional configuration of an estimating apparatus.

FIG. 6 schematically shows one example of a functional configuration the estimating apparatus 200. The estimating apparatus 200 includes an estimate value derivation instruction accepting unit 202, a measurement result acquiring unit 204, an RSRP acquiring unit 212, an RSRQ acquiring unit 216, an SINR acquiring unit 220, a serving/nonserving cell RSSI deriving unit 224, a traffic RSSI deriving unit 230, a nonserving cell RSSI deriving unit 240, a serving cell RSSI deriving unit 242, an estimate value deriving unit 250 and an estimate value output unit 260. It is not essential for the estimating apparatus 200 to include all these configurations.

The estimate value derivation instruction accepting unit 202 accepts an instruction to derive an estimate value of at least any of: a PRB utilization ratio in the cell 22; and a PRB average utilization ratio in the cell 22, the cell 32 and the cell 42. The estimate value derivation instruction accepting unit 202 may accept the derivation instruction via an interface such as a button and a touch panel. Also, the estimate value derivation instruction accepting unit 202 may receive the derivation instruction via a network.

The measurement result acquiring unit 204 acquires a measurement result measured by the measuring instrument 100. The measurement result acquiring unit 204 may receive the measurement result from the measuring instrument 100. Also, the measurement result acquiring unit 204 may receive the measurement result from a storage device that stores therein the measurement result measured by the measuring instrument 100.

The RSRP acquiring unit 212 acquires an RSRP included in the measurement result acquired by the measurement result acquiring unit 204. The RSRP acquiring unit 212 may acquire a serving cell RSRP. Also, the RSRP acquiring unit 212 may acquire a nonserving cell RSRP. The RSRQ acquiring unit 216 acquires a serving cell RSRQ included in the measurement result acquired by the measurement result acquiring unit 204. The SINR acquiring unit 220 acquires an SINR included in the measurement result acquired by the measurement result acquiring unit 204.

The serving/nonserving cell RSSI deriving unit 224 derives a serving/nonserving cell RSSI indicating a total of strengths of reception signals from the cell 22, the cell 32 and the cell 42. The serving/nonserving cell RSSI indicates a total strength of reception signals from the cell 22, the cell 32 and the cell 42 in the entire band. The serving/nonserving cell RSSI deriving unit 224 derives a serving/nonserving cell RSSI indicating a total of strengths of reception signals from the cell 22, the cell 32 and the cell 42 based on the serving cell RSRQ acquired by the RSRQ acquiring unit 216 and the serving cell RSRP acquired by the RSRP acquiring unit 212. The serving/nonserving cell RSSI deriving unit 224 calculates the serving/nonserving cell RSSI for example according to Equation 4.

Serving/nonserving cell RSSI=(Serving cell RSRP/ Serving cell RSRQ)*$N$

The serving/nonserving cell RSSI deriving unit 224 may derive the serving/nonserving cell RSSI by referring to correspondence data in which a combination of a serving cell RSRP and an RSRQ, and a serving/nonserving cell RSSI are associated with each other.

The traffic RSSI deriving unit 230 derives a traffic RSSI indicating a total of reception signal strengths of traffic signals at a spot of measurement by the measuring instrument 100 within the cell 22. The traffic RSSI deriving unit 230 may derive a traffic RSSI based on the serving cell RSRP and the nonserving cell RSRP acquired by the RSRP acquiring unit 212, and the serving/nonserving cell RSSI derived by the serving/nonserving cell RSSI deriving unit 224.

For example, the traffic RSSI deriving unit 230 calculates the traffic RSSI by subtracting the serving cell RSRP and the nonserving cell RSRP in the entire band from the serving/nonserving cell RSSI. Also, the traffic RSSI deriving unit 230 may identify the traffic RSSI by referring to correspondence data in which the serving/nonserving cell RSSI, a combination of the serving cell RSRP and the nonserving cell RSRP, and the traffic RSSI are associated with each other.

The traffic RSSI deriving unit 230 may derive the traffic RSSI based on: the serving cell RSRP; the nonserving cell RSRP and the serving/nonserving cell RSSI; and a reception strength of noise. For example, the traffic RSSI deriving unit 230 calculates the traffic RSSI by subtracting the serving cell RSRP, the nonserving cell RSRP and the reception strength of noise in the entire band from the serving/nonserving cell RSSI. Thereby, a traffic RSSI taking into consideration an influence of noise can be calculated.

The nonserving cell RSSI deriving unit 240 derives a nonserving cell RSSI indicating a total of strengths of reception signals from the cell 32 and the cell 42 which are nonserving cells. The nonserving cell RSSI deriving unit 240 may derive the nonserving cell RSSI based on the serving cell RSRP and the nonserving cell RSRP acquired by the RSRP acquiring unit 212, and the SINR acquired by the SINR acquiring unit 220. For example, if the antenna port count is two, RS boost has been performed at 3 dB, frames are synchronized between the serving cell and the nonserving cells, and different RS arrangement patterns are used for the serving cell and the nonserving cells, the nonserving cell RSSI deriving unit 240 calculates the nonserving cell RSSI according to Equation 5.

Nonserving cell RSSI=((Serving cell RSRP/SINR) *8$N$)+(Total nonserving cell RSRP*4$N$)

The total nonserving cell RSRP is a total of nonserving cell RSRPs of a plurality of nonserving cells. The nonserving cell RSSI deriving unit 240 can calculate the nonserving cell RSSI likewise also if the antenna port count is another number. For example, if the antenna port count is one, the nonserving cell RSSI deriving unit 240 may multiply the serving cell RSRP/SINR with 10$N$ in place of 8$N$, and the total nonserving cell average RSRP with 2$N$ in place of 4$N$.

Also, if frames are not synchronized between the serving cell and the nonserving cells, the nonserving cell RSSI deriving unit 240 can calculate the nonserving cell RSSI based on the number of PRBs reference signals of which have been received and the number of PRBs reference signals of which have not been received.

Also, the nonserving cell RSSI deriving unit 240 may identify the nonserving cell RSSI by referring to correspondence data in which a combination of the serving cell RSRP, the nonserving cell RSRP and the SINR, and the nonserving cell RSSI are associated with each other.

The serving cell RSSI deriving unit 242 derives a serving cell RSSI indicating a total of strengths of reception signals from the cell 22. The serving cell RSSI deriving unit 242 may derive the serving cell RSSI based on the serving/ nonserving cell RSSI derived by the serving/nonserving cell RSSI deriving unit 224 and the nonserving cell RSSI derived by the nonserving cell RSSI deriving unit 240. For example, the serving cell RSSI deriving unit 242 calculates the serving cell RSSI by subtracting the nonserving cell RSSI from the serving/nonserving cell RSSI.

Also, the serving cell RSSI deriving unit 242 may identify the serving cell RSSI by referring to correspondence data in which the serving/nonserving cell RSSI and the nonserving cell RSSI, and the serving cell RSSI are associated with each other.

The serving cell RSSI deriving unit 242 may derive the serving cell RSSI based on the serving/nonserving cell RSSI, the nonserving cell RSSI and the reception signal strength of noise. For example, the serving cell RSSI deriving unit 242 calculates the serving cell RSSI by subtracting the nonserving cell RSSI and the reception signal strength of noise from the serving/nonserving cell RSSI. Thereby, a serving cell RSSI taking into consideration an influence of noise can be calculated.

The estimate value deriving unit 250 derives an estimate value of at least any of: a PRB utilization ratio in the cell 22; and a PRB average utilization ratio in the cell 22, the cell 32 and the cell 42. The estimate value deriving unit 250 may derive the PRB average utilization ratio in the cell 22, the cell 32 and the cell 42 based on the serving cell RSRP and the nonserving cell RSRP acquired by the RSRP acquiring unit 212, and the traffic RSSI derived by the traffic RSSI deriving unit 230. For example, if the antenna port count is two, RS boost has been performed at 3 dB, and frames are synchronized between the serving cell and the nonserving cells, the estimate value deriving unit 250 calculates a serving/nonserving cell RSRP from the serving cell RSRP and the nonserving cell RSRP to calculate an estimate value of the PRB average utilization ratio according to Equation 6.

Average utilization ratio estimate value=(Traffic RSSI/Serving/nonserving cell RSRP)/8N If the antenna port count is one, the estimate value deriving unit 250 may divide by 4N in place of 8N, and if the antenna port count is four, the estimate value deriving unit 250 may divide by 16N in place of 8N. Also, if RS boost has not been performed, the estimate value deriving unit 250 may divide by 20N in place of 8N. Also, if the antenna port count is four and RS boost has not been performed, the estimate value deriving unit 250 may divide by 44N in place of 8N. In this manner, the estimate value deriving unit 250 may calculate an estimate value of the PRB average utilization ratio by using an equation corresponding to conditions of whether or not RS boost has been performed, of a ratio of RS boost, and of the antenna port count. Also, if frames are not synchronized between the serving cell and the nonserving cells, the estimate value deriving unit 250 may calculate an average utilization ratio estimate value by varying 8N of Equation 6 based on the number of PRBs reference signals of which have been received, and the number of PRBs reference signals of which have not been received.

Also, the estimate value deriving unit 250 may derive an estimate value of the PRB utilization ratio in the cell 22 based on the serving cell RSRP acquired by the RSRP acquiring unit 212, and the serving cell RSSI derived by the serving cell RSSI deriving unit 242. For example, if the antenna port count is two and RS boost has been performed at 3 dB, the estimate value deriving unit 250 calculates an estimate value of the PRB utilization ratio in the cell 22 according to Equation 7.

Average utilization ratio estimate value=(Serving cell RSSI−(4N*Serving cell RSRP))/8N*Serving cell RSRP)

If the antenna port count is one, the estimate value deriving unit 250 may multiply the serving cell RSRP with 2N in place of 4N, and multiply the serving cell RSRP with 4N in place of 8N. Also, if RS boost has not been performed, the estimate value deriving unit 250 may multiply the serving cell RSRP with 20N in place of 8N. In this manner, the estimate value deriving unit 250 may calculate a PRB utilization ratio estimate value in the cell 22 by using an equation corresponding to conditions of whether or not RS boost has been performed, of a ratio of RS boost, and of the antenna port count.

The estimate value output unit 260 outputs the estimate value derived by the estimate value deriving unit 250. The estimate value output unit 260 may display the estimate value derived by the estimate value deriving unit 250 on a display provided to the estimating apparatus 200. Also, the estimate value output unit 260 may cause a display provided to another apparatus to display the estimate value derived by the estimate value deriving unit 250.

Figure 7:
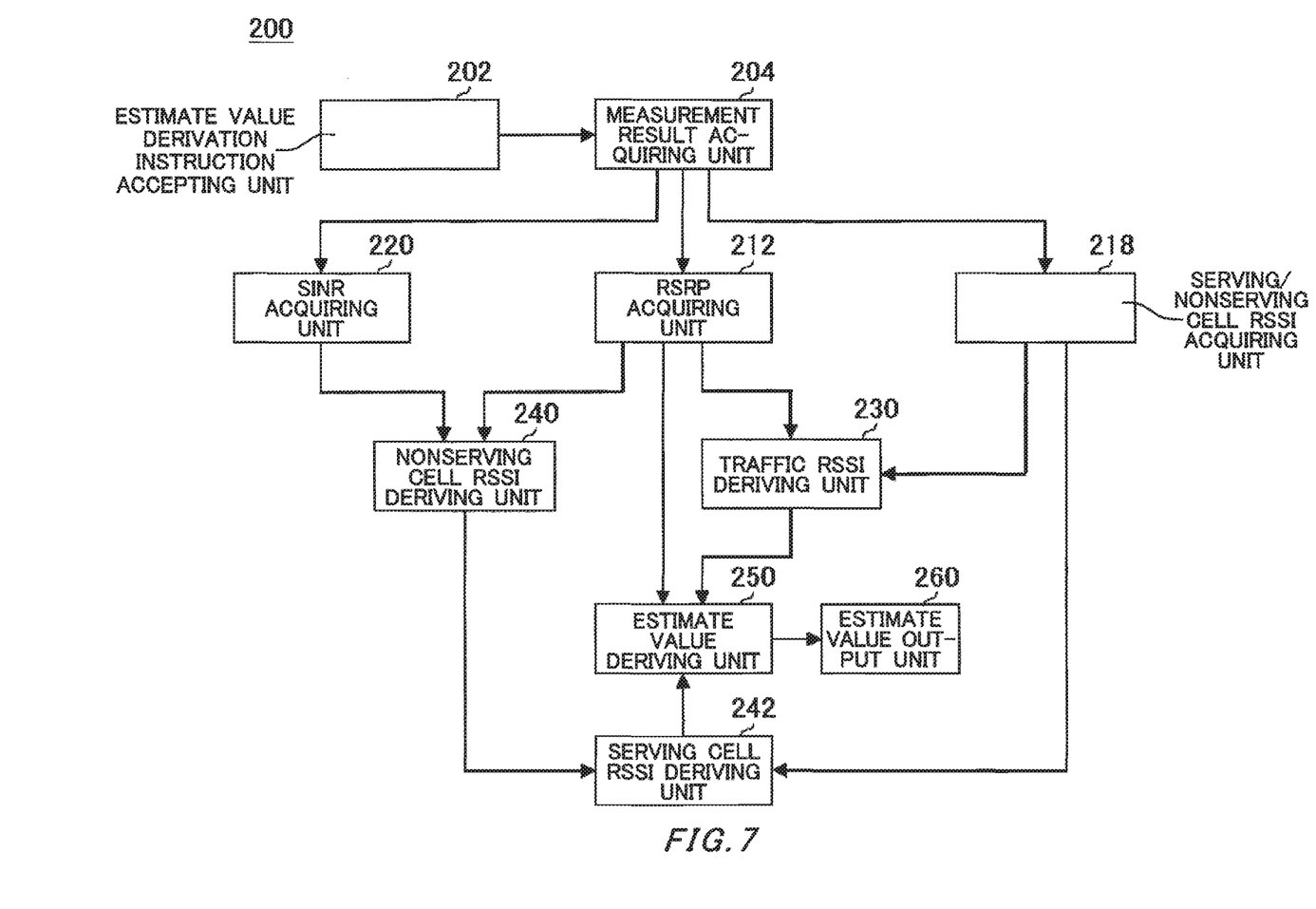
FIG. 7 schematically shows another example of a functional configuration of the estimating apparatus.

FIG. 7 schematically shows another example of a functional configuration of the estimating apparatus 200. The estimating apparatus 200 includes the estimate value derivation instruction accepting unit 202, the measurement result acquiring unit 204, the RSRP acquiring unit 212, a serving/nonserving cell RSSI acquiring unit 218, the SINR acquiring unit 220, the traffic RSSI deriving unit 230, the nonserving cell RSSI deriving unit 240, the serving cell RSSI deriving unit 242, the estimate value deriving unit 250 and the estimate value output unit 260. It is not essential for the estimating apparatus 200 to include all these configurations. Here, differences from the estimating apparatus 200 shown in FIG. 4 are mainly explained.

The serving/nonserving cell RSSI acquiring unit 218 acquires a serving/nonserving cell RSSI. The serving/nonserving cell RSSI acquiring unit 218 may acquire the serving/nonserving cell RSSI included in the measurement result acquired by the measurement result acquiring unit 204.

The traffic RSSI deriving unit 230 may derive a traffic RSSI based on the serving cell RSRP and the nonserving cell RSRP acquired by the RSRP acquiring unit 212, and the serving/nonserving cell RSSI acquired by the serving/nonserving cell RSSI acquiring unit 218. Also, the serving cell RSSI deriving unit 242 may derive a serving cell RSSI based on the serving/nonserving cell RSSI acquired by the serving/nonserving cell RSSI acquiring unit 218, and the nonserving cell RSSI derived by the nonserving cell RSSI deriving unit 240.

Figure 8:
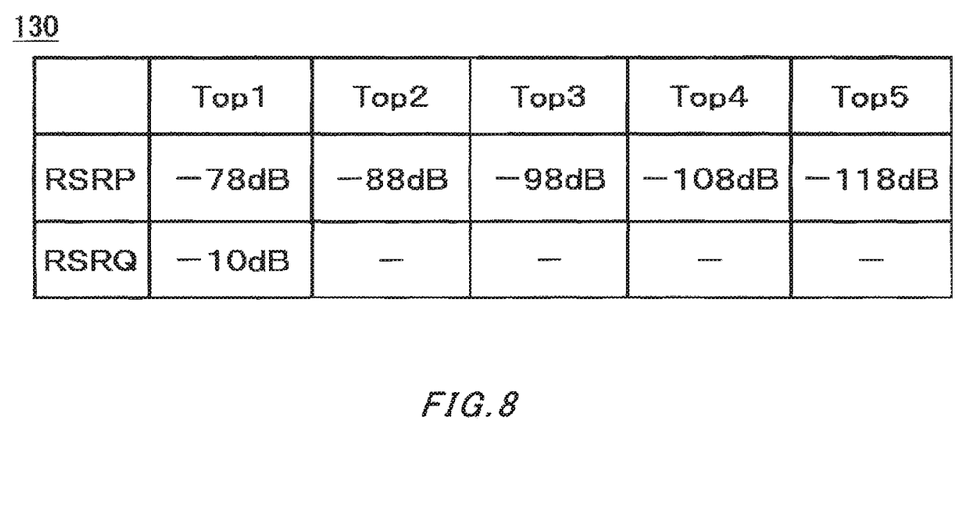
FIG. 8 schematically shows one example of a measurement result.

FIG. 8 schematically shows one example of a result of measurement 130 by the measuring instrument 100. The measurement result 130 shown in FIG. 8 includes a serving cell RSRP measured by the measuring instrument 100, and top four nonserving cell RSRPs, and an RSRQ. An example in which the antenna port count is two, RS boost has been performed at 3 dB, and frames are synchronized between the serving cell and the nonserving cells is explained here.

The estimating apparatus 200 may derive an estimate value of a PRB average utilization ratio of five cells including the serving cell based on the serving cell RSRP measured by the measuring instrument 100, the top five nonserving cell RSRPs, and the RSRQ. The estimating apparatus 200 may use any number of nonserving cell RSRPs included in the measurement result 130. For example, even if the measurement result 130 includes top five nonserving cell RSRPs, the estimating apparatus 200 may derive an estimate value of the PRB average utilization ratio in top four cells by using the top four nonserving cell RSRPs, the serving cell RSRP and the RSRQ.

The RSRP acquiring unit 212 acquires the serving cell RSRP and the top five nonserving cell RSRPs included in the measurement result 130. As shown in Equation 8, the traffic RSSI deriving unit 230 adds together a linear value of the serving cell RSRP, and linear values of the nonserving cell RSRPs to calculate the serving/nonserving cell RSRP.

Added value=$(10^\wedge(-78\text{ dBm}/10)+10^\wedge(-88\text{ dBm}/10)+$
$10^\wedge(-98\text{ dBm}/10)+10^\wedge(-108\text{ dBm}/10)+10^\wedge(-118$
$\text{dBm}/10))=-77.5\text{ dBm}$ As shown in Equation 9, the serving/nonserving cell RSSI deriving unit 224 may calculate the serving/nonserving cell RSSI by dividing a linear value of the serving cell RSRP by a linear value of the RSRQ to multiply the obtained value with the PRB count N.

Serving/nonserving cell RSSI=$(10^\wedge(-78\text{ dBm})/10)/10^\wedge$
$(-10\text{ dB}/10))*N=-68\text{ dBm}+10*\log_{10}(N)$ As shown in Equation 10, the traffic RSSI deriving unit 230 may calculate the traffic RSSI by subtracting a linear value of a value obtained by multiplying, with 4N, an added value calculated according to Equation 8 from the linear value of the serving/nonserving cell RSSI calculated according to Equation 9.

Traffic RSSI=$10^\wedge((-68\text{ dBm}+10*\log_{10}(N))/10)-10^\wedge$
$((-77.5\text{ dBm}+10*\log_{10}(4N))/10)=-70.6\text{ dBm}+$
$10*\log_{10}(N)$ As shown in Equation 11, the estimate value deriving unit 250 may calculate an estimate value of the PRB utilization ratio based on the linear value of the traffic RSSI calculated according to Equation 10, and the serving/nonserving cell RSRP calculated according to Equation 8.

Average utilization ratio estimate value=$10^\wedge((-70.6$
$\text{dBm}+10*\log_{10}(N))/10)/10^\wedge(-77.5\text{ dBm})/10))/$
$8N\approx 62.5\%$ As described above, with the estimating apparatus 200 according to the present embodiment, in one example of the measurement result 130 shown in FIG. 8, an estimate value of a PRB average utilization ratio in the serving cell and the five nonserving cells having highest RSRPs can be calculated as 62.5%.

In the explanation above, each unit of the estimating apparatus 200 may be realized by hardware or realized by software. Also, it may be realized by a combination of hardware and software. Also, execution of a program may cause a computer to function as the estimating apparatus 200. The program may be installed, from a computer-readable medium or a storage device connected to a network, in the computer that constitutes at least part of the estimating apparatus 200.

The programs that are installed in the computer and cause the computer to function as the estimating apparatus 200 according to the present embodiment may act on a CPU or the like to respectively cause the computer to function as each unit of the estimating apparatus 200. Information processing described in these programs is read in by the computer to function as a specific means realized by cooperation between software and hardware resources of the estimating apparatus 200.

Although an example in which the measuring instrument 100 and the estimating apparatus 200 are separate bodies is explained in the present embodiment, examples are not limited thereto. The estimating apparatus 200 may have functions of the measuring instrument 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: LTE system; 20: eNB; 22: cell; 30: eNB; 32: cell; 40: eNB; 42: cell; 100: measuring instrument; 102: measurement instruction accepting unit; 110: measurement control unit; 112: RSRP measuring unit; 114: RSRQ measuring unit; 116: RSSI measuring unit; 118: SINR measuring unit; 120: measurement result output unit; 130: measurement result; 200: estimating apparatus; 202: estimate value derivation instruction accepting unit; 204: measurement result acquiring unit; 212: RSRP acquiring unit; 216: RSRQ acquiring unit; 218: serving/nonserving cell RSSI acquiring unit; 220: SINR acquiring unit; 224: serving/nonserving cell RSSI deriving unit; 230: traffic RSSI deriving unit; 240: nonserving cell RSSI deriving unit; 242: serving cell RSSI deriving unit; 250: estimate value deriving unit; 260: estimate value output unit

What is claimed is:

1. A non-transitory computer readable storage medium that has stored thereon a program that causes a computer to function as:
   a measurement result acquiring unit that acquires: a serving cell RSRP (Reference Signal Received Power) indicating a reception strength of a reference signal received from one cell of an LTE (Long Term Evolution) system; an RSRQ (Reference Signal Received Quality) indicating a reception quality of the reference signal; and a non-serving cell RSRP indicating a reception strength of a reference signal received from another cell other than the one cell, the serving cell RSRP, the RSRQ and the non-serving cell RSRP being measured within the one cell; and
   an estimate value deriving unit that derives, based on the serving cell RSRP, the RSRQ and the non-serving cell RSRP, an estimate value of at least any of: a PRB (Physical Resource Block) utilization ratio in the one cell; and a PRB average utilization ratio in the one cell and the other cell.

2. The non-transitory computer readable storage medium according to claim 1, wherein the computer is caused to function further as:
   a serving/non-serving cell RSSI deriving unit that derives, based on the RSRQ, a serving/non-serving cell RSSI (Received Signal Strength Indicator) indicating a total of strengths of reception signals from the one cell and the other cell; and
   a traffic RSSI deriving unit that derives, based on the serving cell RSRP, the non-serving cell RSRP and the serving/non-serving cell RSSI, a traffic RSSI indicating a total of reception signal strengths of traffic signals at a spot of measurement within the one cell, wherein
   the estimate value deriving unit derives, based on the serving cell RSRP, the non-serving cell RSRP and the traffic RSSI, an estimate value of a PRB average utilization ratio in the one cell and the other cell.

3. The non-transitory computer readable storage medium according to claim 2, wherein based on a percentage, relative to the traffic RSSI, of a serving/non-serving cell RSRP indicating a sum of average reception signal strengths of reference signals of the one cell and the other cell that is derived from the serving cell RSRP and the non-serving cell RSRP, the estimate value deriving unit derives an estimate value of a PRB average utilization ratio in the one cell and the other cell.

4. The non-transitory computer readable storage medium according to claim 1, wherein
the measurement result acquiring unit further acquires an SINR (Signal-to-Interference and Noise power Ratio) measured within the one cell,
the computer is caused to function further as:
a serving/non-serving cell RSSI deriving unit that derives, based on the RSRQ, a serving/non-serving cell RSSI indicating a total of strengths of reception signals from the one cell and the other cell;
a non-serving cell RSSI deriving unit that derives, based on the serving cell RSRP and the SINR, a non-serving cell RSSI indicating a total of strengths of reception signals from the other cell; and
a serving cell RSSI deriving unit that derives, based on the serving/non-serving cell RSSI and the non-serving cell RSSI, a serving cell RSSI indicating a total of strengths of reception signals from the one cell, and
the estimate value deriving unit derives, based on the serving cell RSSI and the serving cell RSRP, an estimate value of a PRB utilization ratio in the one cell.

5. An estimating apparatus comprising:
the non-transitory computer readable storage medium according to claim 1; and
a processor operable to execute the program.

6. A non-transitory computer readable storage medium that has stored thereon a program that causes a computer to function as:
a measurement result acquiring unit that acquires: a serving cell RSRP indicating a reception strength of a reference signal received from one cell of an LTE system; a non-serving cell RSRP indicating a reception strength of a reference signal received from another cell other than the one cell; and a serving/non-serving cell RSSI indicating a total of strengths of reception signals from the one cell and the other cell, the serving cell RSRP, the non-serving cell RSRP and the serving/non-serving cell RSSI being measured within the one cell; and
an estimate value deriving unit that derives, based on the serving cell RSRP, the non-serving cell RSRP and the serving/non-serving cell RSSI, an estimate value of at least any of: a PRB utilization ratio in the one cell; and a PRB average utilization ratio in the one cell and the other cell.

7. The non-transitory computer readable storage medium according to claim 6, wherein the computer is caused to function further as:
a traffic RSSI deriving unit that derives, based on the serving cell RSRP, the non-serving cell RSRP and the serving/non-serving cell RSSI, a traffic RSSI indicating a total of reception signal strengths of traffic signals at a spot of measurement within the one cell, wherein
the estimate value deriving unit derives, based on the serving cell RSRP, the non-serving cell RSRP and the traffic RSSI, an estimate value of a PRB average utilization ratio in the one cell and the other cell.

8. The non-transitory computer readable storage medium according to claim 7, wherein based on a percentage, relative to the traffic RSSI, of a serving/non-serving cell RSRP indicating a sum of average reception signal strengths of reference signals of the one cell and the other cell that is derived from the serving cell RSRP and the non-serving cell RSRP, the estimate value deriving unit derives an estimate value of a PRB average utilization ratio in the one cell and the other cell.

9. The non-transitory computer readable storage medium according to claim 6, wherein
the measurement result acquiring unit further acquires an SINR measured within the one cell,
the computer is caused to function further as:
a non-serving cell RSSI deriving unit that derives, based on the serving cell RSRP and the SINR, a non-serving cell RSSI indicating a total of strengths of reception signals from the other cell; and
a serving cell RSSI deriving unit that derives, based on the serving/non-serving cell RSSI and the non-serving cell RSSI, a serving cell RSSI indicating a total of strengths of reception signals from the one cell, and
the estimate value deriving unit derives, based on the serving cell RSSI and the serving cell RSRP, an estimate value of a PRB utilization ratio in the one cell.

10. An estimating apparatus comprising:
the non-transitory computer readable storage medium according to claim 6; and
a processor operable to execute the program.

11. The non-transitory computer readable storage medium according to claim 1, wherein the estimate value deriving unit derives, based further on an antenna port count of the one cell, an estimate value of at least any of: a PRB utilization ratio in the one cell; and a PRB average utilization ratio in the one cell and the other cell.

12. The non-transitory computer readable storage medium according to claim 6, wherein the estimate value deriving unit derives, based further on an antenna port count of the one cell, an estimate value of at least any of: a PRB utilization ratio in the one cell; and a PRB average utilization ratio in the one cell and the other cell.

13. The non-transitory computer readable storage medium according to claim 1, wherein the estimate value deriving unit derives, based further on a ratio between a maximum value of a transmission/reception signal strength of a traffic signal in an entire band in one symbol and a signal strength of one reference signal, an estimate value of at least any of: a PRB utilization ratio in the one cell; and a PRB average utilization ratio in the one cell and the other cell.

14. The non-transitory computer readable storage medium according to claim 6, wherein the estimate value deriving unit derives, based further on a ratio between a maximum value of a transmission/reception signal strength of a traffic signal in an entire band in one symbol and a signal strength of one reference signal, an estimate value of at least any of: a PRB utilization ratio in the one cell; and a PRB average utilization ratio in the one cell and the other cell.

15. The non-transitory computer readable storage medium according to claim 1, wherein the estimate value deriving unit derives, based further on an RS (Reference Signal) boost ratio, an estimate value of at least any of: a PRB utilization ratio in the one cell; and a PRB average utilization ratio in the one cell and the other cell.

16. The non-transitory computer readable storage medium according to claim 6, wherein the estimate value deriving unit derives, based further on an RS boost ratio, an estimate value of at least any of: a PRB utilization ratio in the one cell; and a PRB average utilization ratio in the one cell and the other cell.

17. The non-transitory computer readable storage medium according to claim 1, wherein the estimate value deriving unit derives, based further on whether or not frames are synchronized between the one cell and the other cell, an estimate value of at least any of: a PRB utilization ratio in the one cell; and a PRB average utilization ratio in the one cell and the other cell.

18. The non-transitory computer readable storage medium according to claim 6, wherein the estimate value deriving unit derives, based further on whether or not frames are synchronized between the one cell and the other cell, an estimate value of at least any of: a PRB utilization ratio in the one cell; and a PRB average utilization ratio in the one cell and the other cell.

19. A method comprising:
- acquiring: a serving cell RSRP indicating a reception strength of a reference signal received from one cell of an LTE system; an RSRQ indicating a reception quality of the reference signal; and a non-serving cell RSRP indicating a reception strength of a reference signal received from another cell other than the one cell, the serving cell RSRP, the RSRQ and the non-serving cell RSRP being measured within the one cell; and
- deriving, based on the serving cell RSRP, the RSRQ and the non-serving cell RSRP, an estimate value of at least any of: a PRB utilization ratio in the one cell; and a PRB average utilization ratio in the one cell and the other cell.

* * * * *